United States Patent
Keats et al.

[11] Patent Number: 6,167,461
[45] Date of Patent: Dec. 26, 2000

[54] PROGRAMMABLE HIGH PERFORMANCE DISK FORMATTER FOR HEADERLESS DISK DRIVE CONTROLLER EXECUTING A SERIES OF LOW LEVEL INSTRUCTIONS GENERATED BY A HIGH LEVEL PROCESSING ENGINE

[75] Inventors: Dennis Keats, Riverside; Kang Xiao, Irvine, both of Calif.

[73] Assignee: Texas Instruments Incorporated, Dallas, Tex.

[21] Appl. No.: 09/052,145

[22] Filed: Mar. 31, 1998

[51] Int. Cl.[7] .............................. G06F 13/10; G06F 9/22
[52] U.S. Cl. ........................ 710/5; 360/77.08; 710/74; 712/226
[58] Field of Search ........................ 360/77.08; 712/220, 712/225, 226; 710/5, 74

[56] References Cited

U.S. PATENT DOCUMENTS

| | | |
|---|---|---|
| 4,651,237 | 3/1987 | Williams . |
| 4,736,341 | 4/1988 | Redmond et al. . |
| 4,773,004 | 9/1988 | Gershenson et al. .................... 711/113 |
| 4,809,091 | 2/1989 | Miyazawa et al. . |
| 4,888,691 | 12/1989 | George et al. . |
| 5,166,936 | 11/1992 | Ewert et al. . |
| 5,315,456 | 5/1994 | Hessing et al. . |
| 5,345,561 | 9/1994 | Kato . |
| 5,345,575 | 9/1994 | English et al. . |
| 5,406,426 | 4/1995 | Culley et al. . |
| 5,410,680 | 4/1995 | Challa et al. . |
| 5,422,763 | 6/1995 | Harris . |
| 5,440,716 | 8/1995 | Schultz et al. . |
| 5,452,458 | 9/1995 | Suzuki . |
| 5,546,556 | 8/1996 | Matsushita . |
| 5,592,648 | 1/1997 | Schultz et al. . |
| 5,612,834 | 3/1997 | Strang, Jr. . |
| 5,623,700 | 4/1997 | Parks et al. . |
| 5,627,946 | 5/1997 | Strang, Jr. . |
| 5,644,786 | 7/1997 | Gallagher et al. . |
| 5,654,835 | 8/1997 | Kusano . |
| 5,680,023 | 10/1997 | Komaki . |
| 5,682,272 | 10/1997 | Taroda et al. . |
| 5,682,522 | 10/1997 | Huang et al. . |
| 5,684,972 | 11/1997 | Hill et al. .................................. 711/4 |
| 5,689,729 | 11/1997 | Inoue . |
| 5,708,793 | 1/1998 | Franaszek et al. . |
| 5,903,410 | 5/1999 | Blaum et al. ........................ 360/77.08 |
| 5,909,336 | 6/1999 | Shaffner et al. ..................... 360/77.08 |
| 5,940,358 | 8/1999 | Kato ............................................ 369/84 |
| 5,963,386 | 10/1999 | Assouad ..................................... 360/48 |
| 5,983,309 | 11/1999 | Atsatt et al. ................................ 711/4 |

FOREIGN PATENT DOCUMENTS

98/14939   4/1998   WIPO .

*Primary Examiner*—Thomas C. Lee
*Assistant Examiner*—Ilwoo Park
*Attorney, Agent, or Firm*—W. Daniel Swayze, Jr.; Wade James Brady, III; Frederick J. Telecky, Jr.

[57] ABSTRACT

A programmable disk formatter for a disk controller in a headerless hard disk drive (HDD) system is disclosed. The disk formatter includes a high level processing engine that generates on the fly low level instructions that are executed by a low level processing engine. The disk formatter also includes a servo interface for interfacing the disk formatter to the servo timing logic, sector direct memory access (SDMA), and a QT/SP interface for interfacing the disk formatter to other processors in the disk controller, such as a system processor (SP) or Q-transmogrifier (QT) processor. The high level engine and low level engine operate semi-independently. The former processes SP- or QT-converted host computer commands in such a fashion that the low level instructions are generated and passed by the high level engine in time for the low level engine to execute them in coordination with the disk data rate. The high level engine is programmable with a high level instruction set, assembly language in the preferred embodiment, so that different drive formats can be accommodated with only software changes involving reprogramming of the high level engine and certain tracking/geometry tables stored in memory. The architecture and logic of the disk controller render a highly flexible, easily programmable. user friendly solution to the problem that disk controller designers face in accommodating each new generation of magnetic disks and each new approach to formatting.

30 Claims, 5 Drawing Sheets

PROGRAMMABLE HIGH PERFORMANCE DISK FORMATTER FOR HEADERLESS DISK DRIVE CONTROLLER EXECUTING A SERIES OF LOW LEVEL INSTRUCTIONS GENERATED BY A HIGH LEVEL PROCESSING ENGINE

FIELD OF THE INVENTION

The present invention relates to the field of disk drive controllers for computer systems, and particularly to a highly programmable disk formatter in a hard disk drive (HDD) embedded controller for a headerless system that is easily programmable to accommodate different formatting schemes and different drives.

BACKGROUND OF THE INVENTION

Magnetic media hard disks have in recent years become a standard peripheral to computer systems, large and small. A typical current generation hard disk consists of one or more semi-rigid platters that are coated with particles capable of being magnetized to encode information. Each of the platters typically has a hole permitting the multiple platters to be placed onto a spindle, so that they are stacked in substantially parallel planes. Each platter may have up to two surfaces that can be magnetized, so that a typical hard disk consisting of n platters is capable of having 2n surfaces available for the reading and writing of data. The data magnetically encoded onto the platters is typically read or written by a single head, or series of heads, such as Magneto Resistance (MR) effect heads, well known in the art.

Each hard disk surface is physically divided into a series of concentric tracks running from the inner diameter to the outer diameter. The number of tracks may depend on the disk manufacturer. Moreover, rapidly changing technology in this area has permitted an increase in disk density (e.g. tracks per inch or bits per inch). A hard disk is also logically divided into a series of fields which are accessible by the head, and which are largely defined by the process of formatting. A typical hard disk will have both servo fields and data sector fields. Servo fields permit the head to locate itself onto the center of the track before attempting to access the data sectors. Data sectors are typically established by the formatting process, with each sector containing 512 bytes of information in a DOS-based computer system.

There are numerous approaches to the configuration of the various fields in a hard disk. Each of these approaches involves tradeoffs in simplicity, data density efficiency and disk seek time. The logical configuration of the data sectors may be pursuant to what is known in the art as header-type formatting or headerless formatting. Header-type formatting provides for each data sector to include an identification header that uniquely identifies that data sector, thus permitting the drive logic to determine when the magnetic head has reached a particular sector. The data sectors can be allocated onto the disk tracks pursuant to constant frequency recording (CFR) or constant density recording (CDR). The CDR approach is further refined in Zone Density Recording (ZDR), wherein the platter is logically divided into a series of zones of concentric tracks. Each zone has a different recording frequency and data separation, but each track within a zone has the same number of sectors. Strange, et. al., U.S. Pat. No. 5,627,946, "Hard disk format using frames of sectors to optimize location of servo bursts," and Harris, U.S. Pat. No. 5,422,763, "Split field zone data recording," both contain helpful discussions pertaining to the various formatting schemes for hard disks, and are hereby incorporated by reference.

Because header-type formatting provides that each data sector must be appended with its own identification information, the overall data efficiency of the disk is significantly reduced. As a result, current HDD's are most often formatted for a headerless configuration. In a headerless HDD system, each data sector does not have a header identification segment. However, the platter still has a number of servo fields that are now further used to calibrate timing logic in the disk controller to locate specific data sectors.

FIG. 1 refers to one possible configuration for a headerless disk system. The hard disk has a number of platters 100, and a series of heads 120 corresponding to each readable/writable surface. The surface of platter 140 is divided into one or more zones 245, 250 and 255, in this example three zones, each zone containing a number of tracks. The surface is also divided into a number of servo wedges 160, each of which defines servo fields in each track radiating from the inner to the outer diameter. In this example there are six servo wedges. Between each pair of servo wedges 160, there is a data wedge 180, which defines one or more data sectors in each track radiating from the inner to the outer diameter of the surface. On each track 220 within the data wedge there is one or more data sectors 200. As can be appreciated from the figure and the previous discussion, the physical and logical layout of the magnetic media is subject to wide variation and constant change. Magnetic media may differ according the number and configuration of servo/data wedges, tracks (e.g., tracks per inch or tpi), sectors per track (e.g., bits per inch or bpi), etc. For example, the wedge based logical layout may be substituted with a different tracking/geometry scheme.

As the previous discussion demonstrates, the magnetic disks in the HDD can be configured in numerous different fashions. The HDD system must be compatible with the particular disk formatting scheme employed. In particular, the disk controller will include a disk formatter that must be configured (hardware and software) in conformance with the format of the magnetic media. This creates a great challenge to the designer of disk controllers, and disk formatters, in particular, which must be compatible with the magnetic media with which they are integrated. Moreover, even when disk manufacturers have maintained the same basic formatting scheme, advances in technology such as increases in tpi or bpi will require changes to the disk controller, especially the disk formatter, that interfaces between the magnetic media and the general host computer. As a result, the architecture of prior art disk controllers has been such that substantial modifications to hardware and/or substantial, and complex, reprogramming of firmware has been required each time a disk controller is integrated with a physically different magnetic media (e.g., more platters or more data density, etc.) or logically different magnetic media (e.g., changes in disk layout or format). In addition to these general data formatting differences, each vendor may have unique formatting schemes for diagnostic tasks.

What is desired, therefore, is an efficient, highly programmable disk formatter that efficiently allocates processing resources between processors, while remaining flexible and user friendly, and that is programmable using a pre-defined instruction set, specially adapted for the disk formatter application, that can accommodate changes from disk to disk or format to format. One benefit of such a disk formatter is that the disk drive manufacturer need not be required to repeatedly redesign the disk formatter to accommodate different or next generation drive programs.

SUMMARY OF THE INVENTION

Accordingly, the present invention is directed to a Programmable High Performance Disk Formatter for Headerless Disk Drive Controller that substantially obviates one or more of the problems and disadvantages of the related art. The principal advantage of the present invention is the provision of an arrangement and method which substantially obviates one or more of the limitations and disadvantages of the described prior arrangements.

It is an object of the present invention to provide a disk formatter within a disk controller that is easily integrated with the servo logic and magnetic media of various physical and logical formats.

It is a further object of the present invention to provide a disk formatter that is flexible insofar that it can be modified to accommodate differently-formatted magnetic media through software reprogramming without resort to changes in hardware. Such a disk formatter would improve upon prior art disk formatters with a "hard wired" or fixed architecture amenable only to a single tracking/geometry configuration.

It is a further object of the present invention to provide such a disk formatter with reprogramming characteristics that are user-friendly insofar as reprogramming to accommodate different magnetic media is done using high level, not low level, reprogramming, using a specially defined instruction set that can be used to adapt to different formats. Such a disk formatter would improve upon prior art disk formatters with a writable control storage (WCS) based architecture that require difficult low level reprogramming to individually control hardware signals such as turning on or off the read gate, write gate and enabling the error correction decoder. Such prior art disk formatters require the designer to have a deep knowledge of the chip hardware design itself, making redesign to accommodate new formats a very time consuming task. The disk formatter of the subject invention permits the user to focus on more easily-comprehended high level instructions, from which follow the more complex, less easily-comprehended, low level hardware signals.

It is a further object of the present invention to provide a disk formatter that includes a high level and low level processing engine, wherein the high level engine generates an instruction stream of low level sequencer instructions to be executed by the low level processing engine to control disk operations, such as read or write operations. The user will reprogram the disk formatter using the high level processing engine. As a result, the low level processing engine, and the low level control signals that it generates, become substantially transparent to the user.

It is also an object of the present invention to provide such a disk formatter that reduces and simplifies the processing demands imposed on higher level processors, such as a separate digital signal processor/microcontroller on the disk controller, or even the host computer itself.

Additional features and advantages of the invention will be set forth in the description which follows. and in part will be apparent from the description, or may be learned by practice of the invention. The objectives and other advantages of the invention will be realized and attained by the apparatus and methods, particularly pointed out in the written description and claims hereof as well as the appended drawings.

To achieve the above objects, and in accordance with the purpose of the invention, as embodied and as broadly described, the present invention is that of apparatus and methods for a highly programmable disk formatter which includes a high level processing engine (also referred to as the sector transmogrifier (ST)) and low level processing engine (also referred to as the sequencer), which operate together to execute the instructions and create the control signals to perform commands issued by a host computer. The high level processing engine executes high level instructions in order to generate an "on-the-fly" sequence of low level instructions. These are passed to the low level engine which executes them to generate the media-dependent control signals that implement the host computer command. In the preferred embodiment, the high level engine and low level engine operate semi-independently.

The high level processing engine is programmable using an instruction set specially developed for the disk formatter, assembly code instructions in the preferred embodiment, that permits the firmware designer to reprogram the disk drive controller to accommodate disk drives with different physical and/or logical configurations. One benefit of the present invention is that a change in the magnetic media configuration or format can be accommodated by reprogramming the high level processor using the high level instruction set, and changing certain stored constants in data tables, rather than reprogramming the sequencer's complex low level instructions. The high level engine is reprogrammable to support vendor-unique requirements, including particular wedge tracking systems, such as conventional index pulse based wedge tracking, well known in the art, or unconventional unique binary sequence (UBS) based wedge tracking, such as that described in detail in the contemporaneously filed application of Xiao, et. al., "A Method of Implementing a Geometry Per Wedge (GPW) Based Headerless Solution in a Disk Drive Formatter and a Computer Program Product Incorporating the Same," and the application of Schaffner, et. al., "Position Detection Scheme for Headerless Disk Controller," U.S. application Ser. No. 08/802,293, now U.S. Pat. No. 5,909,336, filed on Feb. 18, 1997, both of which are herein incorporated by reference. The high level engine is likewise programmable to accommodate various sector geometry schemes used to define the sector layout within the data wedge, such as those relying upon geometry per wedge (GPW), as well as special vendor unique operations and general disk drive operations.

In the preferred embodiment, the disk formatter is designed for integration with magnetic media that are formatted for an interleaved servo, headerless configuration. Since there are no headers to uniquely identify each data sector, the disk controller relies on precision timing logic and a series of data tables for wedge tracking and for the location of specific data sectors within a wedge. The disk formatter of the present invention is capable of being programmed to operate with an index pulse based wedge tracking system, although the preferred embodiment uses a UBS based wedge tracking system. There will be one UBS table for each of the surfaces in the magnetic media. Additionally, data tables with GPW information provide the sector layout within a wedge information, such as the first sector number and total number of sector pulses in the data wedge. In preferred embodiment, the disk formatter is implemented on a semiconductor chip, i.e., an application specific integrated circuit (ASIC).

It will be appreciated that the disk formatter can implement headerless formatting schemes other than UBS/GPW without departing from the underlying inventive concept as described above. It is to be understood that both the foregoing general description and the following detailed description are exemplary and explanatory and are intended to provide further explanation of the invention as claimed.

The accompanying drawings are included to provide a further understanding of the invention and are incorporated in and constitute part of this specification, illustrate several embodiments of the invention and, together with the description, serve to explain the principles of the invention.

BRIEF DESCRIPTION OF THE DRAWINGS

The purpose and advantages of the present invention will be apparent to those of skill in the art from the following detailed description in conjunction with the appending drawings in which like reference characters are used to indicate like elements, and in which.

DETAILED DESCRIPTION OF THE INVENTION

The disk formatter of the subject invention is designed to be hardware compatible with various types of headerless disk drive controllers. As discussed above in the background of the invention, current generation disk drives are most often formatted for an interleaved servo, headerless configuration. Since a headerless drive has no data sector identification information stored on the disk, such systems use precise timing counters, relying on special off-disk tracking/geometry tables, in order to seek and locate particular data sectors. Currently, there are numerous approaches to the physical and logical configuration of headerless drives, and it can be appreciated by those of ordinary skill in the art that the future will bring additional variations. One of the primary benefits of the subject disk formatter is that such variations can be accommodated through software reprogramming of the disk formatter high level processing engine, and changes to tracking/geometry tables stored in memory. As such, the following detailed description of the invention will relate to a disk formatter using a particular UBS/GPW-based headerless format, but those of ordinary skill in the art will recognize that the disk formatter is easily adapted to different formatting schemes, and that the inventive concept therein is not limited to any particular headerless solution. For example, the wedge tracking could rely on an index pulse based tracking system, instead of the UBS wedge tracking system.

Figure 1:
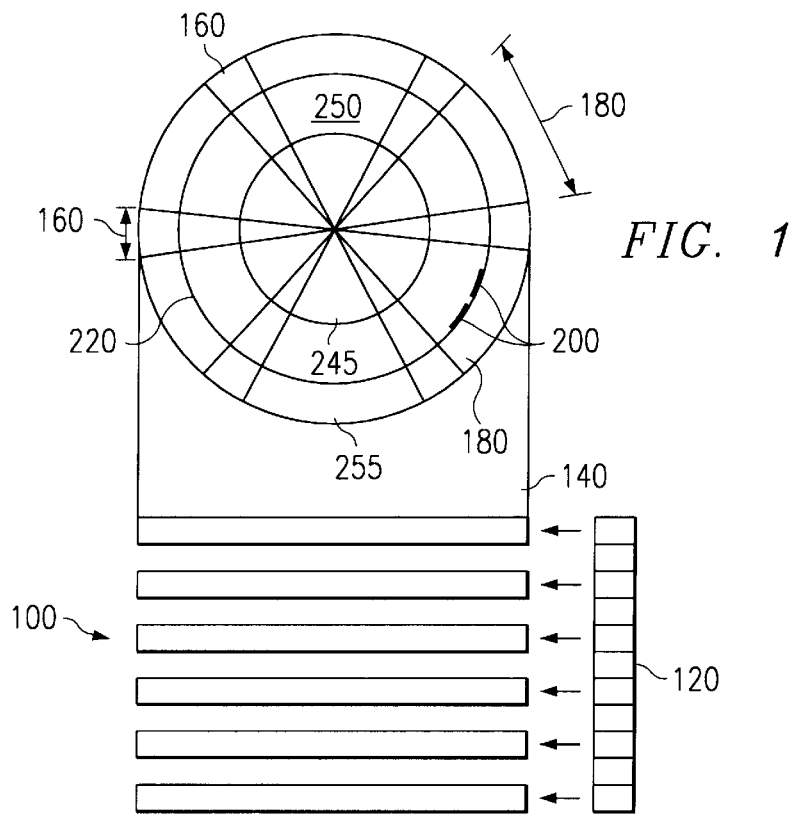
FIG. 1 is a diagram illustrating the magnetic media in a hard drive, including the series of platters, each with one or two magnetized surfaces, as well as the physical and logical layout of a surface.
Figure 3:
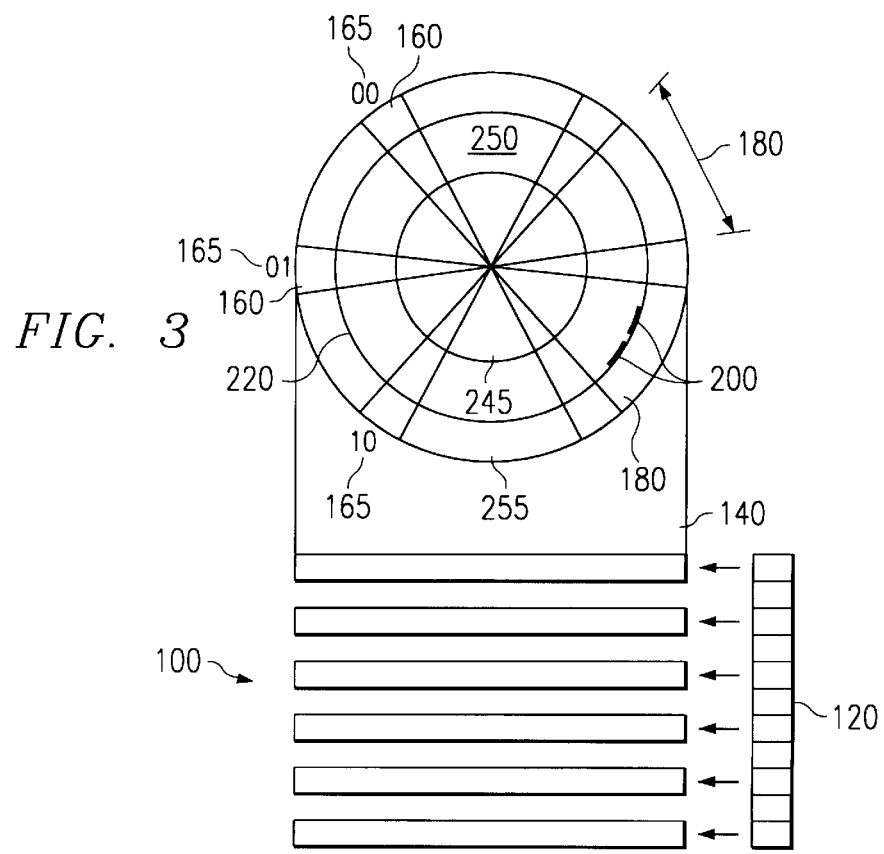
FIG. 3 is a block diagram illustrating the magnetic media in a hard drive where the format is allocated for UBS based wedge tracking.

In the index pulse based wedge tracking system, each servo wedge, which precedes each data wedge, includes a one bit index that is processed by the disk controller logic to establish wedge tracking. For example, a platter containing one hundred servo wedges will include an index bit set to logic 0 in ninety-nine of these wedges, and an index bit set to logic 1 in the remaining servo wedge. Wedge tracking (knowing which particular wedge the head is at) is established by reading and tracking this known sequence of 100 bits. A wedge number count will be incremented for each new wedge, and will be reset by the wedge containing a logic 1 in the index field. As there is only one bit per servo wedge and the sequence (a 1 followed by ninety-nine 0's) is unvarying within a revolution, this approach is susceptible to errors. UBS wedge tracking reduces wedge tracking error. In a UBS based wedge tracking system, as depicted in FIG. 3, each servo wedge 160 contains a two bit UBS field 165. For each platter, the disk controller will now read 200 bits of wedge tracking information per revolution. Moreover, the sequence of UBS values from wedge to wedge is devised to be unique insofar the sequence of UBS values from the wedge defined as wedge 1 to that defined as wedge 100 will be different from the sequence of UBS values from any wedge n to wedge n+99. In this fashion, the tracking algorithm logic permits the wedge tracking system to quickly and accurately establish, within one revolution of a platter, proper wedge tracking so that the current wedge position is known at any given time. The UBS approach to wedge tracking is further discussed in the aforementioned applications that have been incorporated herein.

FIG. 3 refers to the headerless disk format for the preferred embodiment using a unique binary sequence (UBS)/geometry per wedge (GPW) partitioning scheme for the disk. The hard disk has a number of platters 100, and a series of heads 120 corresponding to each readable/writable surface. The surface of a platter 140 is divided into one or more zones 245, 250 and 255, in this example three zones, each zone containing a number of tracks. The surface is also divided into a number of servo wedges 160, each of which defines servo fields in each track radiating from the inner to the outer diameter of the surface. Each servo field in each servo wedge also contains UBS pattern 165, which changes from wedge to wedge, and is a two bit field in the preferred embodiment. In this example there are six servo wedges. Between each pair of servo wedges 160, there is a data wedge 180, which defines one or more data sectors in each track radiating from the inner to the outer diameter of the surface. On each track 220 within the data wedge there is one or more data sectors 200.

Each track 220 on a surface contains the servo fields and the headerless data sectors. Each servo field contains various segments that enable the disk controller to identify that track, identify that servo wedge and the adjacent data wedge, and calibrate the timing logic to locate the subsequent data sectors. In particular, a given servo field will contain data for identifying the servo wedge (UBS bits) and synchronization data, which in the present application is used to reset the disk controller timing logic, to be discussed below. A separate tracking table (UBS table), stored in off-disk memory, exists to permit the disk controller logic to compare detected UBS data to expected UBS data, in order to determine if wedge number tracking is "on track". When the wedges are being tracked by the disk controller logic properly (hereafter referred to as "UBS on_track"), then each servo/data wedge can be identified correctly as it is encountered by the head. In the preferred embodiment of the invention, one UBS table per readable/writable surface will be stored in memory. Associated with each data wedge, and stored in that or a separate memory, will be GPW information that informs the disk controller of the sector layout for each wedge. Thus, there is one UBS table per disk surface, and at least one GPW entry for each data wedge. For the exemplary disk format configuration depicted in FIG. 3, there will actually be a separate GPW entry for each zone in each wedge. As there are 6 wedges and 3 zones, there will be 18 separate GPW entries. Each GPW entry contains information describing the data wedge geometry for that wedge, such as the first sector number, number of sector pulses (each sector pulse corresponding to a full data sector or a fragment) in the wedge, and ending fragment length in bytes. Separate from, or integrated with, the off-disk GPW entries may be a defect table, well known by those of skill in the art, that contains information of those sectors that are defective or otherwise unavailable. At the system level, UBS can be referred to as the wedge tracking system, since it permits confirmation that the head is located on the right surface and at the right wedge, and GPW is the geometry system, which provides the sector layout information within the data wedge. This allows individual sectors to be located following detection of the servo field for that wedge.

It can be appreciated by those of ordinary skill in the art that departures from the preferred embodiment regarding wedge tracking (e.g., using an index pulse based tracking system instead of UBS), or regarding sector layout within the data wedge (e.g., using a different geometry partitioning scheme than GPW) can be made without departing from the underlying inventive concept of the headerless disk drive formatter. The inventive concept behind the invention provides for disk formatter flexibility such that it is reprogrammable to accommodate such different wedge tracking and geometry partitioning schemes.

Figure 2:
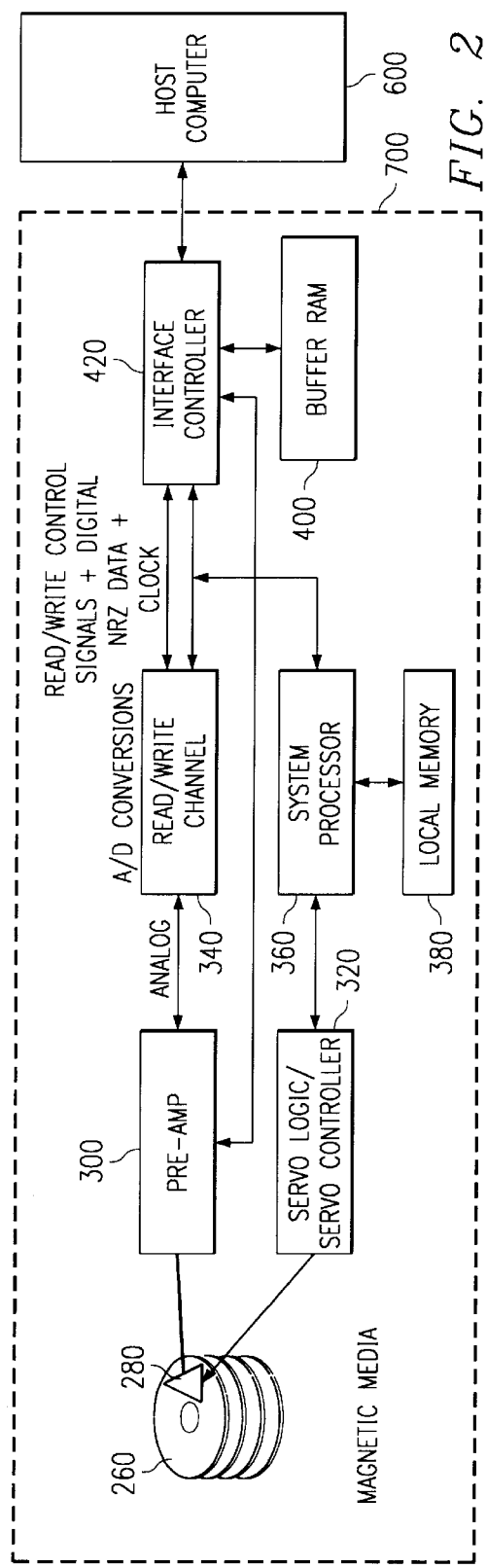
FIG. 2 is a block diagram of a hard disk drive (HDD) system, including the host computer and disk controller, with its various elements, including the interface controller.

FIG. 2 depicts a HDD system capable of utilizing the disk formatter of the subject invention, comprising host computer 600 and disk controller 700. The host computer, through a standard interface, well known in the art, such as small computer system interface (SCSI) or integrated drive electronics (IDE), issues standard format logical requests such as for the writing or retrieval of data to/from the HDD. Disk controller 700 must convert these standard format requests, using the logical block address (LBA), into control instructions specific to the disk format, such as the cylinder/head/sector (CHS), and control the HDD apparatus to read or write the user data at the proper location at the proper time.

Host 600 represents a standard host computer, with a generalized central processing unit (CPU), which issues commands to peripherals such as the HDD system. Host 600 could be standard personal computer. Magnetic media 260 represents a series of readable/writable magnetized platters, and signal pickup head 280 represents one of the possible many read/write heads that write and read data to/from the platter surface. Servo logic/servo controller 320 represents the hardware and logic that controls positioning of the magnetic head under the control of system processor (SP) 360. SP 360 is the system level processor on the disk controller, and can perform various functions, depending on its programming, such as the control of the servo logic, conversion of host LBA logical location to CHS physical location, monitoring of status of the disk controller operations, etc. SP 360 can be a digital signal processor (DSP), microcontroller, or any substantially equivalent device that can perform the disk formatter system level processing. In the preferred embodiment, SP 360 is a DSP. Memory 380 is a local memory which stores various parameters and code/instructions, some of which, upon power-up of the HDD, are transferred into buffer RAM 400. Local memory 380 comprises volatile and nonvolatile memory in the preferred embodiment (SRAM and EPROM), although variations such as DRAM and EEPROM, and other memory types, are contemplated. Buffer RAM 400 is a working memory that also provides temporary storage for user data in transit between the host and the HDD, to account for speed differences. It can also store parameters (e.g., UBS and GPW) and instructions. In the preferred embodiment, local memory 380 will store instructions for the high level engine/SP/QT processors, as well as the UBS/GPW/defect tables. Read/write channel 340 represents the hardware and logic for receiving user data that is being transferred to/from magnetic media 260. It provides for analog-to-digital conversion (ADC), filtering, bit to/from byte conversion, and can process and respond to control signals. Interface controller 420 provides the interface between host computer 600 and the rest of disk controller 700, and includes the disk formatter that is the primary focus of this specification.

The operation of the disk controller can be illustrated using a write command. Host computer 600 issues a command to write certain user data to the HDD. The command, including the data, is passed through an interface to interface controller 420, which will temporarily store the user data in buffer RAM 400 and generate write control signals to read/write channel 340. Responding to these control signals, read/write channel 340 will receive the user data from interface controller 420, and convert the digital data to an analog representation, before passing it to pre-amp 300. Pre-amp 300 will, in turn, perform certain signal processing operations (e.g., filtering operations or amplitude adjustments) that are well known in the art. The analog data is then written onto magnetic media 260 by signal pickup head 280, under the control of servo logic/servo controller 320. Servo logic/servo controller 320 controls the location and operation of the head, as well as the spindle speed, based on control information generated by SP processor 360, in order to write the user data onto the magnetic media at the proper location and at the proper time. The function of local memory 380 is to store, among other things, certain parameters and instructions that, upon power-up of the HDD, are transferred into a working memory such as buffer RAM 400, so that they can be accessed by interface controller 420.

If host computer 600 issues a read command, the function of the various blocks is substantially the converse of the above, except for certain differences, easily appreciated by one of ordinary skill in the art, such as the fact that read/write channel will be controlled to transport data to, not from, the interface controller, and such data will be converted to, not from, digital format.

Figure 4:
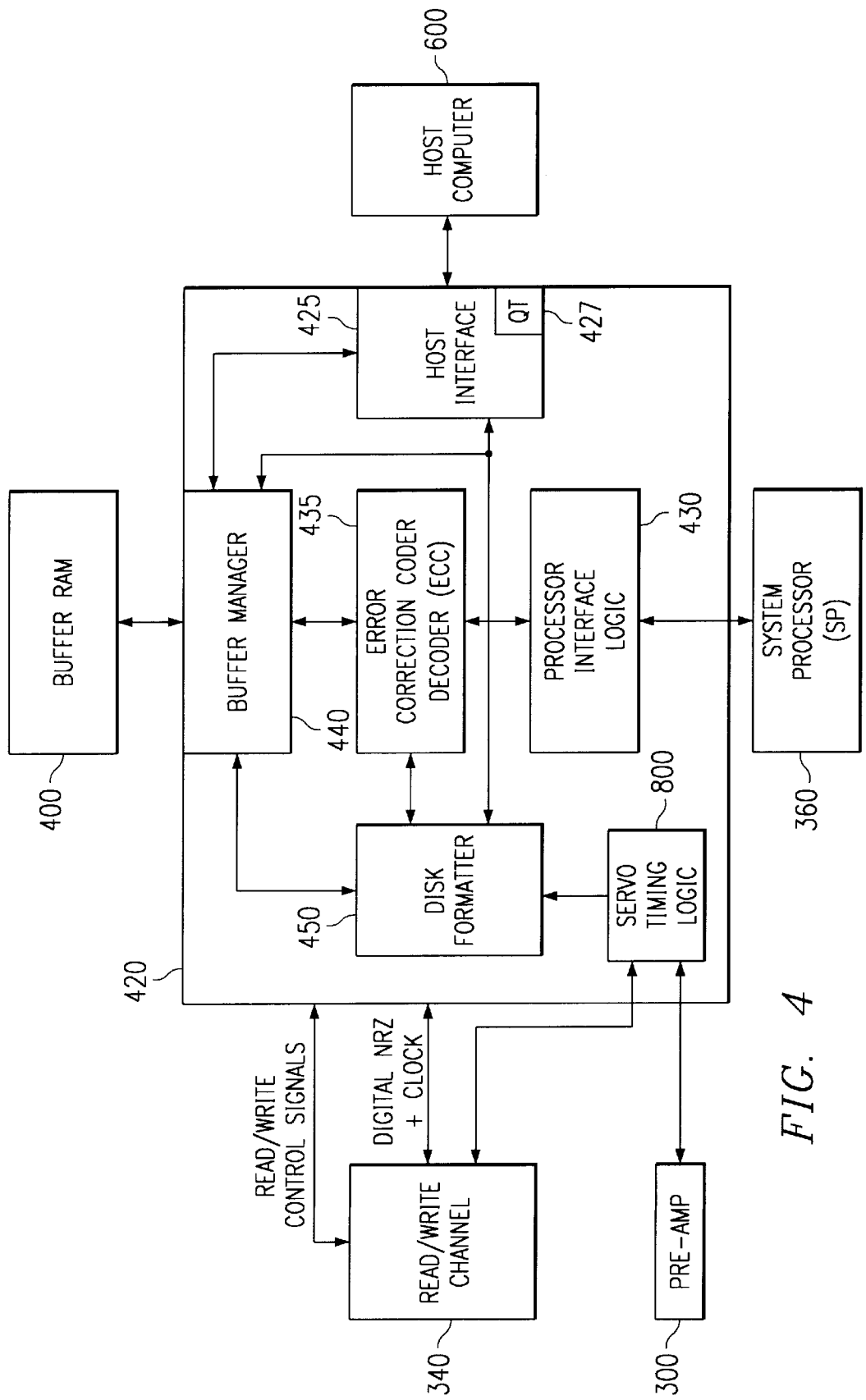
FIG. 4 is a block diagram of the interface controller implementing the elements of the present invention, including the QT processor, servo timing logic and programmable high performance disk formatter for headerless hard disk drive controller.

FIG. 4 illustrates interface controller 420 utilizing the disk formatter of the subject invention. Interface controller 420 includes processor interface logic 430 that allows the interface controller to interface with SP processor 360; error correction coder/decoder 435 that encodes/decodes error correction bits; buffer manager 440 for managing the transfer of data to/from buffer RAM 400; and host interface 425 for receiving the standard format commands issued by host computer 600 based on particular interface standards (e.g., SCSI, IDE, etc.). It should be noted that in the preferred embodiment, host interface 425 includes its own processor, Q-transmogrifier (QT) 427, that can be used to reduce the processing load imposed on SP 360 and the processors on the disk formatter. QT 427 can perform such tasks as prioritizing the host commands received from host computer 600. In the preferred embodiment, QT 427 will perform the initial defect table search when a host command is received, although this function could easily be performed by SP 360 or high level engine 480 of disk formatter 450, discussed below. Interface controller 420 also includes servo timing logic 800, which processes segments in the servo field and provides a timing counter that counts from the servo synchronization segment in a servo wedge to the synchronization segment in the next servo wedge. The operation of interface controller 420 can be illustrated by a write operation. The host computer issues a write command with a logical address and some user data. Host interface 425 receives the command, interprets the bits according to a standard interface and, using QT 427, reorders or reformats them in conformance with the command format of the disk controller. The user data is passed through buffer manager 440 to buffer RAM 400 for temporary storage. The LBA address of the write command is converted by either SP 360 or QT 427 (SP does conversion in the preferred embodiment) to a cylinder/head/sector (CHS) address that identifies the physical location on the magnetic media where the data is to be written. SP 360 now programs certain registers in servo logic/servo controller 320 that cause it to select the proper head and seek to the desired track. The pickup head is now located on the proper surface and on the proper track. SP 360 will also program certain registers in disk formatter 450 with information identifying the current wedge number (wedge number count), the current zone number, and the target sector number. In the preferred embodiment, SP 360 will also execute the wedge number tracking algorithm (although it could easily be implemented by the high level engine of the disk formatter, to be discussed below) to track the wedges passing by the head. The current wedge number is written into a register(s) accessible to SP 360 and disk formatter 450, in order to maintain a wedge number count. For each wedge, disk formatter 450 will retrieve from buffer RAM 400 the GPW entry corresponding to the current wedge number. This permits the disk controller to also maintain a sector number count for the current wedge, relying on time count information provided by servo timing logic 800. Each time the sector number count is incremented, it is compared against the target sector number. When the sector number count within disk formatter 450 compares equal to the target sector number, disk formatter 450 will communicate the write gate hardware control signal(s) and user data (retrieved from buffer RAM 400 through buffer manager 440) to read/write channel 340, in order to write the user data to the target sector. Disk formatter will also issue control signals to start/stop ECC coder 435 to calculate check bytes while the data is being transferred to read/write channel 340. These check bytes will be passed by disk formatter 450 to the write channel 340 after the user data. As one of ordinary skill in the art can appreciate, should the host command require that the user data be written to a number of sectors, then disk formatter 450 will track the consecutive sectors (accounting for any defective sectors) and generate the low level control signals accordingly.

Figure 5:
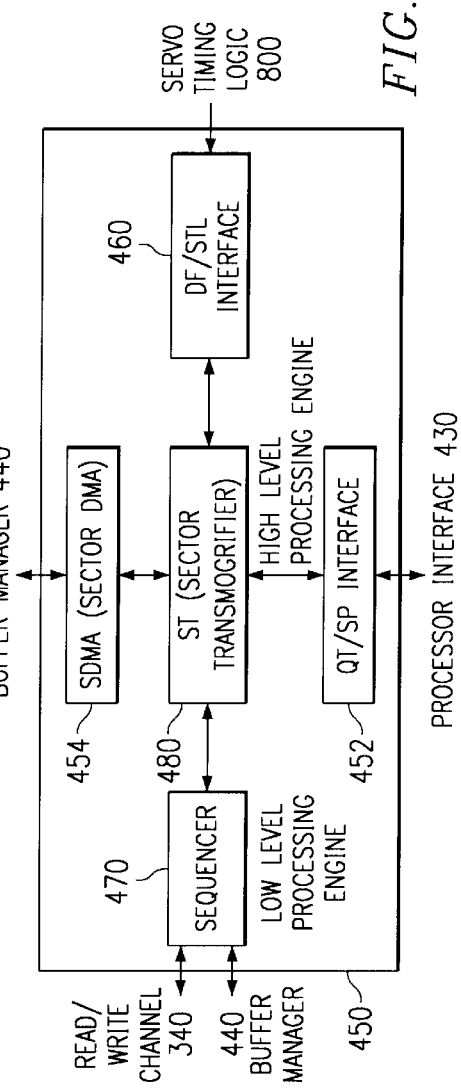
FIG. 5 is a block diagram of the disk formatter of the subject invention, including the high level processing engine (sector transmogrifier), low level processing engine (sequencer), disk formatter/servo timing logic interface, and QT/SP interface.

FIG. 5 illustrates the disk formatter of the present invention. In the preferred embodiment, the disk formatter will be implemented on a semiconductor chip as an application specific integrated circuit (ASIC). Disk formatter 450 includes QT/SP interface 452 for interfacing the disk formatter with SP 360 or QT 427 via processor interface 430; SDMA 454 for providing memory access to buffer manager 440 for non-user data related transfers such as tables and ST instructions; DF/STL interface 460 for interfacing high level engine 480 with servo timing logic 800 to generate sector pulses; low level processing engine 470 (also referred to as the sequencer) and high level processing engine 480 (also referred to as the sector transmogrifier (ST)).

Low level engine 470 performs the low level instruction processing to generate the various hardware control signals that implement a given command. Low level engine 470 will generate and issue the read/write gate control signals that control read/write channel 340 to perform the operations, as previously described, necessary to carry a read or write command into effect. The low level engine also issues control signals cause buffer manager 440 to transfer user data, stored in buffer RAM 400, to/from read/write channel 340. Sequencer 470 also issues control signals to ECC 435 to cause the error correction bit check or generation required for a read or write operation, respectively. Sequencer 470 generates these various control signals by executing a series of low level instructions. Sequencer 470 receives these low level instructions from, and substantially operates under the control of, high level engine 480. The path between low level engine 470 and high level engine 480 provides for the communication of the instructions themselves, as well as cuing signals that inform the low level engine when to begin executing a series of instructions previously generated by the high level engine.

High level engine 480 is a sixteen bit processor running at 40 MHz in the preferred embodiment. It interfaces with all elements of disk formatter 450. The high level engine (HLE) monitors the various operations of the other elements of disk formatter 450, and stores various status information in registers that are accessible by other processors such as SP 360 and QT 427. When SP 360 sends a command to HLE 480, SP 360 will also write to a program counter that causes the high level engine to begin executing instructions. The high level engine 480 will execute high level instructions out of local cache or local ROM (further described in connection with FIG. 6) to generate low level instructions, on a sector by sector basis, as required for that command. The low level instructions generated by high level engine 480 are stored in a sequencer queue (FIFO RAM in the preferred embodiment), pending execution by low level engine 470. In the preferred embodiment, the series of instructions generated for a particular sector transfer are communicated to the sequencer queue as a "burst" of instructions on a substantially sector by sector basis. It should be noted that the high level engine can also transfer to the sequencer queue any necessary parameters associated with a particular low level instruction. At the proper time, i.e., when the timing logic within the high level engine (i.e., the sector number count) determines that the magnetic head is at or just before the target sector, the high level engine sends a cuing signal (Seq_start) that causes the low level engine 470 to start executing the instructions stored in the queue. Execution of these low level instructions creates the previously described hardware control signals. When the sequencer completes execution of all instructions for that command, high level engine 480 will issue an interrupt to SP 360 and will execute a STOPST (see Table 1 below) instruction to stop high level engine execution.

The user can program high level engine 480 for (a) general purpose instructions for general operations such as moving data and arithmetic operations (Type I instructions), and (b) special purpose sequencer instructions for controlling disk operations (Type II instructions). These Type II instructions are programmed by the user (disk firmware designer) for high level engine operation in conformance with the disk format, including the wedge tracking system, geometry tables, and defect tables. During instruction execution, high level engine 480 recognizes Type II instructions and translates them to corresponding low level instructions. In the preferred embodiment, one bit of the instruction word (some instructions will require two words) will identify it as a Type I or Type II instruction. In the preferred embodiment, high level engine 480 is programmed to operate according to the previously described UBS/GPW wedge tracking and sector location within a wedge scheme. The attendant UBS and GPW entries will be programmed into local memory 380 and, upon power-up, are read into buffer RAM 400 so that they are accessible by the high level engine.

The specially defined high level instruction set includes the Type I instructions of Table 1, which in the preferred embodiment are assembly code instructions in 16 bit words, including the opcode and operand. The italicized characters are specific bits in the 16 bit instruction, and refer to literals, addresses or conditions.

TABLE 1

Type I High Level Engine instruction set.

| Instruction | Description |
|---|---|
| ADD | Add File Register and Accumulator. |
| INC | Increment File Register. |
| SUB | Subtract Accumulator from File Register. |
| DEC | Decrement File Register. |
| SHL | Shift File Register left one bit. |
| SHR | Shift File Register right one bit. |
| XOR | XOR File Register and Accumulator. |
| AND | AND File Register and Accumulator. |
| OR | OR File Register and Accumulator. |
| TST | Test File Register for zero. |
| MOVEA | Move File Register to Accumulator. |
| MOVEF | Move Accumulator to File Register. |
| MOVEM | Move File Register to Memory Address Register (MAR). |
| RDMEM | Read multiple words *www* from buffer memory (beginning @ MAR address) to File Register. |
| WRMEM | Write multiple words *www* from File Register to buffer memory (beginning @ MAR address). |
| DIVSHL | Shift File Register left and add/subtract Accumulator. |
| ORQ | OR File Register and divide quotient bit. |
| LDMAR | Load literal *xxxxxxxx* into MAR. |
| LDACCL | Load Accumulator low byte with literal *xxxxxxxx* and clear high byte. |
| LDACCH | Load Accumulator high byte with literal *xxxxxxxx*. |
| BC | Branch to address *xxxxxxxxxxxxxxxx* (second word) if any selected condition *cccc* in group *ggg* of operand (first word) is true (two word instruction). |
| BNC | Branch to address *xxxxxxxxxxxxxxxx* (second word) if all selected conditions *cccc* in group *ggg* of operand (first word) are false (two word instruction). |
| BCS | Branch to address *xxxxxxxxxxxxxxxx* (second word) if any selected condition *cccc* in group *ggg* of operand (first word) is true, and save return address (two word instruction). |
| BNCS | Branch to address *xxxxxxxxxxxxxxxx* (second word) if all selected conditions *cccc* in group *ggg* of operand (first word) are false, and save return address (two word instruction). |
| SWAP | Swap the low and high byte of File Register. |
| WRREGA | Write Accumulator to a disk formatter register selected by *xxx*. |
| RDREGA | Read to Accumulator from disk formatter register selected by *xxx*. |
| BACC | Branch to address in Accumulator. |
| STOPST | Stop the ST (high level engine) execution. |
| RTN | Branch to saved return address. |
| SEQSTART | Start the sequencer execution of instructions in the low level engine queue (FIFO RAM). |
| DIVCLR | Initialize divide flags. |
| BACCS | Branch to address in Accumulator and save return address. |

Figure 6A:
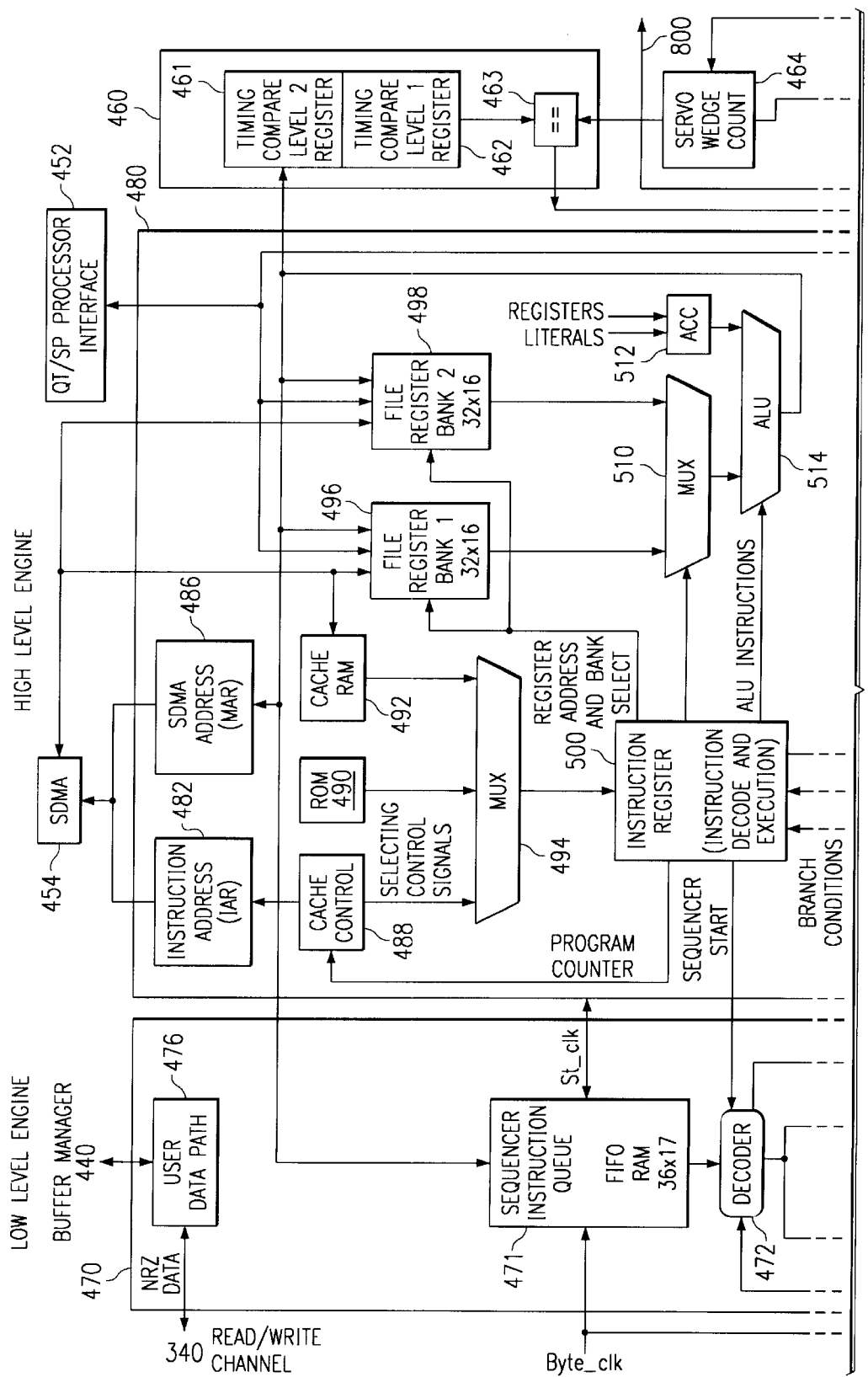
FIG. 6 is a detailed diagram of the high level engine, low level engine, and disk formatter/servo timing logic interface.
Figure 6B:
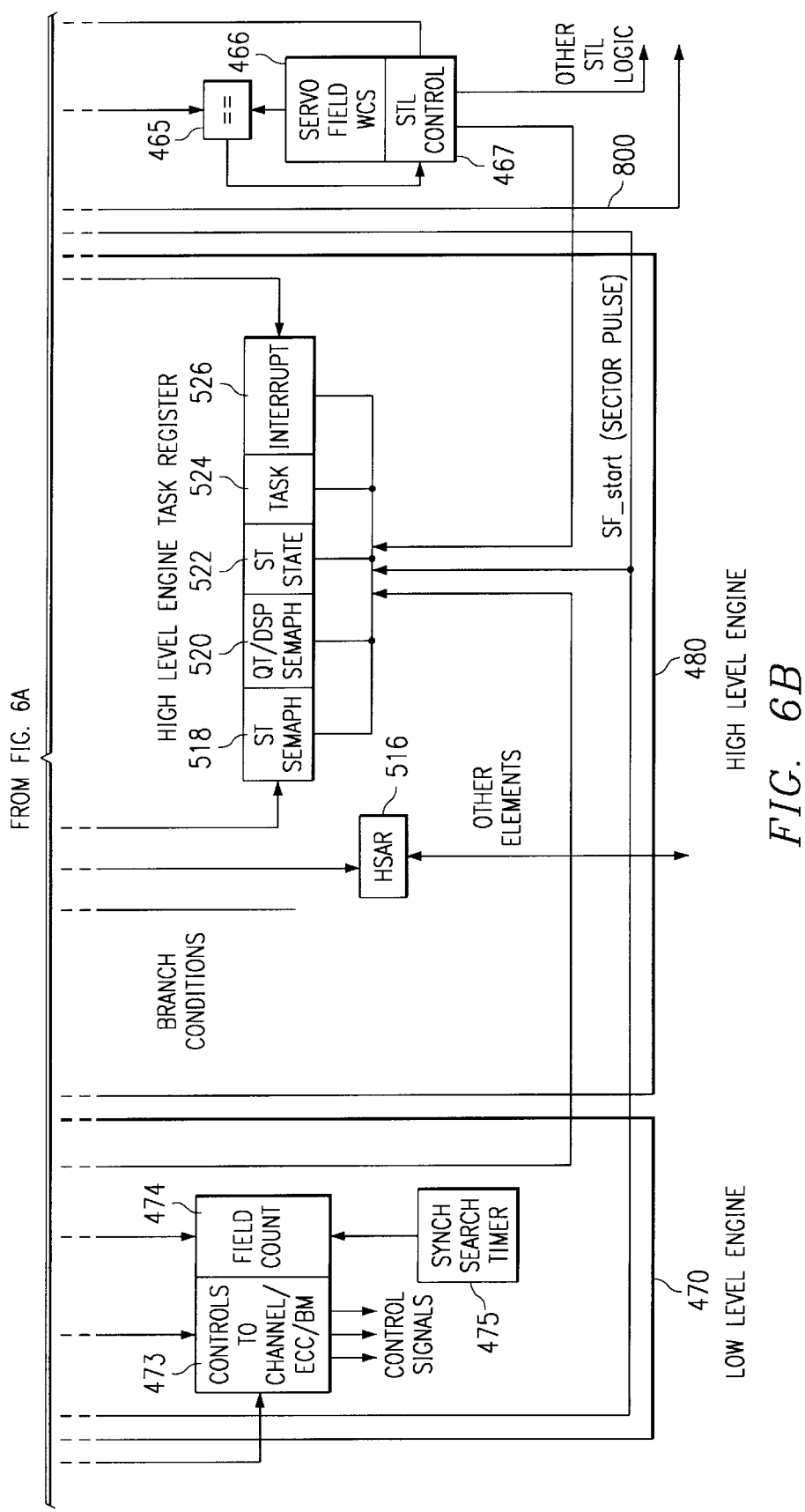

It should also be noted that wherever the instructions include reference to a file register, the 16 bit word will include a 6 bit address for the file register. Also, it should be noted that the DIVSHL, DIVCLR and ORQ commands are specifically created to facilitate the implementation of a divide subroutine. As is known to those of ordinary skill in the art, assembly language implementation of a divide will be through a series of register shifts and add/subtracts, which can be implemented in subroutines that can be further streamlined using special commands similar to the aforementioned three. Finally, the conditions that comprise the operand in some of the above instructions can be set through signal inputs to the high level engine, as depicted in FIG. 6 ("branch conditions").

The specially defined instruction set for the high level processing engine 480 also includes the Type II sequencer instructions listed in Table 2, which are high level instructions executed to create the low level instructions that are executed by low level engine 470. As before, the preferred embodiment uses assembly code instructions in 16 bit words, including the opcode and operand.

TABLE 2

Type II High Level Engine instruction set.

| Instruction | Description |
|---|---|
| SKIPBYTES | Delay execution of next instruction for period (in bytes) specified by value in File Register |
| WAITSEST | Delay execution of next instruction until next sector pulse, unless timeout specified by value in File Register. |
| WAITSYNC | Delay execution of next instruction until data synch pattern from read channel, unless timeout specified by value in File Register. |
| RDDATA | Read number of bytes of data specified by value in File Register. |
| RDECC | Read number of ECC bytes specified by value in File Register. |
| WRPLO | Write number of PLO (phase lock oscillator field) bytes specified by value in File Register. |
| WRSYNC | Write number of sync pattern bytes specified by value in File Register. |
| WRDATA | Write number of data field bytes specified by value in File Register. |
| WRECC | Write number of ECC bytes specified by value in File Register. |
| WRPAD | Write number of PAD bytes specified by value in File Register. |
| SEQSTOP | Stop execution by the low level engine. |

In the preferred embodiment, each 16 bit Type II high level instruction is converted by the high level engine to a 17 bit low level instruction as follows. Bits 10–13 of the Type II instruction are mapped to bits 13–16 of the low level instruction. Bits 6–9 of the Type II instruction are mapped to bits 9–12 of the low level instruction. Bits 0–5 of the Type II instruction represent the file register address from which nine bits are read. These nine bits are then mapped to bits 0–8 of the low level instruction. It should also be noted that the Type II instructions may have certain option bits which, if set, require the high level engine to retrieve a previously calculated parameter from a register. The parameter will be stored in the low level instruction queue, along with the 17 bit low level instruction.

Given the description of this specification, the detailed figures, and the above listing of the high level instruction set, it is well within the capability of one of ordinary skill in the art to comprehend the subject matter as claimed in order to make and use the same.

FIG. 6 provides a detailed diagram of the low level engine 470, high level engine 480 and DF/STL interface 460, as well as the pertinent elements of servo timing logic 800. Read/write channel 340, buffer manager 440, QT/SP interface 452 and SDMA 454 were described in connection with the previous figures. Servo timing logic 800 includes servo wedge count 464 that is a running time counter; servo field WCS 466 that provides compare values to detect certain segments of the servo field (such as the UBS bits); STL control 467 that provides control signals based on each processed segment in the servo field (such as UBS on_track when the UBS is detected); and comparator 465 for comparing the servo field compare values from element 466 to the running time counter value in element 464. It should be noted that counter 464 is reset periodically, e.g., at the servo synch segment in the servo field for each new servo wedge.

DF/STL interface 460 includes timing compare level 1 register 462 for storing the computed timing value for the next data sector; timing compare level 2 register 461 for storing the computed timing value for the following data sector; and comparator 463 for generating a sector pulse (SF_start) each time there is a compare equal, indicating the start of the next data sector.

High level engine 480 includes a register with bit groups 518–526, accessed through a data bus, which is referred to as the high level engine task register. It can be appreciated by those of skill in the art that these bit groups could be stored within one register or partitioned among several registers. Registers 518 and 520 are semaphores that are user definable to provide one-way communication between the high level engine and SP 360/QT 427. Bit group 526 is an interrupt bit set by the high level engine to interrupt SP 360/QT 427. ST state 522 and task 524 are used to inform the high level engine of changes in state or the need to commence a processing task. The operation of the high level engine programming in the preferred embodiment is such that HLE 480, following receipt of a command from SP 360, will execute a loop that periodically checks the HLE task register to ascertain new tasks or changes in state (e.g., if the disk controller is no longer tracking wedge numbers properly, HLE will be informed that the status of UBS on_track has changed). HSAR 516 is a hardware status and action register which provides a two way communications channel between the high level engine and other elements of the disk controller.

The high level engine 480 also includes file register 496 (bank 1) and file register 498 (bank 2) which function as "scratch pads" for the HLE, and also permit communication between HLE 480 and SP 360/QT 427. The use of these banks can be allocated in various fashions. In the preferred embodiment, bank 1 496 is used for tracking purposes, including storing the wedge number count (current wedge number), current zone, GPW entry, sector number count, and target sector number. In the preferred embodiment, bank 2 498 is used by SP 360 and/or QT 427 to exchange command and status related parameters with HLE 480, such as transfer related parameters when a transfer command from SP 360 or QT 427 is active. As one of ordinary skill in the art can appreciate, the two banks could be differently partitioned and conflicts could be resolved by implementing a communications protocol between HLE 480 and SP 360/QT 427. For example, semaphores could be set that would prevent ST or SP/QT from accessing the same register at the same time. The logical partitioning of the preferred embodiment, however, eliminates the need for such logic and any resultant processing delay.

Cache control 488, ROM 490 and instruction cache RAM 492 cooperate to provide high level instructions to ST 480 based on the program counter (PC). MUX 494 selects between the instructions available from ROM 490 or cache RAM 492 based on selecting control signals issued by cache control 488. Cache control 488 and cache RAM 492 implement the instruction caching logic of the HLE to reduce instruction access time. In the preferred embodiment, instruction cache 492 is a 16×16 RAM. Since the nature of the subject invention is such that high level engine 480 may have to fetch the same piece of code repeatedly (as in a loop) from buffer RAM 400, buffer bandwidth can be maintained by incorporating cache and the necessary logic. In the preferred embodiment, there are two lines of cache, each line containing eight words. There is also a tag associated with each line for cache detection. In the preferred embodiment. the tag is thirteen bits, although the full address is sixteen bits. The cache logic provides for periodic updating of the instruction cache with instructions, so that instructions that are executed by high level engine 480 can be subsequently retrieved from cache memory when there is a cache match or hit. If cache control 488 detects that PC points to ROM 490, then the instruction is fetched from local ROM. Otherwise, the PC instruction will be in cache RAM 492 if there is a cache hit and, if not, it will be retrieved from buffer RAM 400 through cache RAM 492. Instruction address (IAR) 482 contains the address from which the cache seeks retrieves instructions, and SDMA address register (MAR) 486 is another memory address register for retrieving parameters (such as UBS tables, GPW tables entries or defect tables) from buffer RAM 400. MAR 486 is used, for instance, when the HLE executes memory access instructions that require access to buffer memory through the SDMA, as in the RDMEM or WRMEM instructions of Table 1.

The final elements of the high level engine in FIG. 6 are instruction register (IR) 500, MUX 510, accumulator (ACC) 512 and ALU 514. IR 500 selects the high level instructions using PC and executes them. This includes the conversion of Type II high level instructions to low level instructions for input to instruction queue 471. IR 500 also controls file registers 496 and 498, and issues arithmetic instructions to ALU 514. IR 500 commences sequencer execution of low level instructions when the HLE executes the SEQSTART instruction. ALU 514 performs basic arithmetic operations for the high level engine, such as calculating the timing compare values entered into registers 461 and 462 for sector pulse generation. It should be appreciated by those of skill in the art that the ALU operates under the control of IR 500, which can, of course, be programmed to perform various operations using the high level instruction set. MUX 510 selects between the file registers for input to ALU 514, and ACC 512 is a standard accumulator (16 bits in the preferred embodiment) for use in various logical and arithmetic commands executed by IR 500.

As depicted in FIG. 6, various registers and stored literals are input to ACC 512. For example, it may be required that an OR operation be performed on some data stored in file register bank 1 (496) and the current UBS value. In such a case, the high level engine will execute an OR instruction (see Table 1) using (a) the data loaded from bank 1 into ALU 514, and (b) the current UBS value loaded from its register to ACC 512. It can be appreciated by one of ordinary skill in the art that there are numerous permutations of the disk formatter hardware, regarding the number of registers and the data partitioning between them, but that said permutations do not depart from the underlying inventive concept of the disk formatter.

Low level engine 470 includes user data path 476 which provides a user data path between buffer manager 440 and the read/write channel 340; sequencer instruction queue 471 which provides an instruction queue for low level instructions passed from the high level engine; decoder 472 for executing low level instructions and converting them to hardware control signals (e.g., read gate or write gate); controls to channel 473 for issuing the control information to the proper element; field count 474 for counting the number of cycles for an instruction in bytes (e.g., an RDDATA high level instruction to read 512 bytes will result in a field count 474 value of 512); and synch search timer 475 for providing a timeout value, such as when the instruction corresponds to a WAITSYNC instruction, wherein execution of the next instruction is delayed pending some event or condition.

Regarding timing, the high level engine clock is tied to the overall HDD system processing power requirements, which depends on the host and data transfer rate, here St_clk. In the preferred embodiment, the 40 MHz high level engine processor executes one instruction per clock cycle for most instructs, so that the processing rate approaches 40 MIPS. It should also be noted that low level engine 470 runs pursuant to Byte_clk, which is tied to the disk transfer rate, although the low level engine will accept instructions from IR 471 into queue 471 pursuant to St_clock. The high level and low level engines operate semi-independently. The former will generate and transfer into instruction queue 471 the low level instructions that the latter will begin to execute upon the Seq_start signal. The high level engine will issue a low level stop processing instruction to stop execution of low level instructions by the low level engine. The low level stop processing instruction is generated by the high level engine as a result of the SEQSTOP (high level) instruction from Table 2. The timing relationship between the high level processing engine and the low level processing engine is further described in the contemporaneously filed application of Keats, et. al., "An Apparatus and Method for Providing For Efficient Communication Between High Level and Low Level Processing Engines of a Disk Drive Formatter," herein incorporated by reference.

The cooperation of the various elements of FIG. 6 can be illustrated by a read command issued by host computer 600 to read 100 sectors of data starting from LBA 1000. Host interface 425 will reorder and reformat the command, and issue an interrupt to inform SP 360 that the read command is pending. SP 360 responds by translating the LBA 1000 to the corresponding CHS (cylinder/head/sector), in this instance, cylinder 50, head 3 and sector 57 (all assumed). SP 360 will now program registers in servo logic/servo controller 320 that cause the read head to locate to cylinder 50 and head 3, i.e., the proper track in the correct zone. SP 360 will write to one of task registers 518–526 (here it will be task 524) to indicate to high level engine 480 that a command is pending. SP 360 will also initialize file register bank 1 496 and file register bank 2 498 with information including the target sector number (57) and a command opcode corresponding to the read command. This command opcode may correspond to a subroutine of high level instructions for implementing the read command. High level engine 480 has a loop which constantly checks task bits 518–526 to determine the next processing task. Upon checking task register 518–526, high level engine 480 knows that a command is pending, the nature of the command (read), and the target sector number (57).

Meanwhile, SP 360 has been executing the wedge tracking logic (using UBS) that was previously described. SP 360 processes each UBS field, as it is detected, to confirm that wedge tracking is on track. If so, a UBS_on track signal is passed to HLE task register 518–526 (here ST state 522) to inform high level engine 480 that the data wedges are being properly tracked by the disk controller logic. As each new servo wedge is encountered, SP 360 will process the UBS bits to confirm the wedge number, which is written to a SP-maintained register. When the new read command is issued, this wedge number is written to file register bank 1 496, so that high level engine 480 can maintain a wedge number count. SP 360 also computes the zone number (here it is assumed that cylinder 50/head 3 will correspond to zone 2), which is also written to file register bank 1 496. The zone number and wedge number count will enable the high level processing engine 480 to retrieve the correct GPW entry as each new data wedge is encountered by the read head.

At this point, high level engine 480 is maintaining in file register bank 1 496 a wedge number count (current wedge), current zone number (2), and target sector number (57); and in file register bank 2, a command code for a read instruction to read 100 sectors of user data beginning at the target sector. High level engine 480 will also maintain a sector number count for the current wedge. Each time a new servo wedge is detected by STL 800, the wedge number count will be incremented based on a status bit that is set in task register 518–526. It can be said that the high level engine is now tracking the wedge number and the sector number. As will be described below, each time a new wedge is encountered, the sector number count will be reinitialized by the first sector number segment in the GPW entry. It will then be incremented by each subsequent sector pulse event. For example, if the wedge number count is 2 (wedge 2), and the sector number count is 40 (sector 40) when a new servo wedge is detected, then the wedge number count is incremented to 3 (wedge 3). The GPW entry for wedge 3/zone 2 will be retrieved, and should include a first sector number segment of 41, which will be used to reinitialize the sector number count to 41.

Returning to FIG. 6, as each new data wedge is encountered and the wedge number count is incremented, IR 500 will execute instructions to cause the GPW entry for that wedge/zone to be read, through SDMA 454, into file register bank 1 496. As previously described, the GPW entry has various data including the starting sector number and the total number of sector pulses per wedge. Using this data, high level engine will maintain the sector number count by counting the sectors for that wedge, sector pulse by sector pulse. IR 500 will execute instructions to control MUX 510, ACC 512 and ALU 514 to generate the timing compare values for the next data sector (placed in timing compare level 1 register 462) and the following sector (placed in timing compare level 2 register 461). Each time servo wedge count timer 464 (reset at the synch segment of each new servo wedge) compares equal to the timing compare value in register 462, a sector pulse (SF_start) is generated to set a bit in HLE task register 518–526. This bit permits the high level engine to update the sector number count. On each such occurrence, the value in register 461 will be moved into register 462, and the ALU will calculate the timing compare value for the following sector. In this fashion, high level engine 480 will track the sectors in each new data wedge, sector pulse by sector pulse. With each new sector pulse, the current sector number will be compared to the target sector (57). At the next servo wedge, servo wedge count 464 will be reset, the sector number count will be reinitialized, the corresponding GPW entry for the new wedge will be retrieved, and the process repeated.

High level engine 480 must generate each burst of low level instructions before the target sector is reached. In the preferred embodiment, IR 500 of the high level engine will always be executing the high level instructions one target sector in advance, so that by the time the current target sector is reached, the low level instructions are already loaded into low level engine queue 471, and the high level engine is in the process of generating the series of low level instructions for the next target sector. For this example, by the time the high level engine 480 determines that the head is at sector 56 (one before first target sector 57), IR 500 retrieves, using address pointer PC, the high level instructions required to implement the read command for sector 57, executes said instructions to create the corresponding low level sequencer instructions, and loads them into queue 471. At or just before the sector tracking logic of high level engine 480 determines that the head is at sector 57, IR 500 will execute a SEQSTART Type I instruction. This generates a Seq_start low level signal that causes decoder 472 to begin processing the burst of low level instructions for sector 57 that are stored in instruction queue 471. This results in the output of the hardware control signals from element 473 to control the read channel 340, ECC 435 and buffer manager 440, as previously described, in order to read the user data from sector 57. IR 500 will at that point be executing the high level instructions required to generate the burst of low level instructions for the next sector (58).

The aforementioned logic will be substantially repeated until each and every data sector of the requested 100, beginning at sector 57, are read from the magnetic media and passed through buffer RAM 400, for output by host interface 425 to the host computer 600. Following the last sector (logical 156), high level engine 480 executes the SEQSTOP Type II high level instruction to issue a corresponding low level instruction to stop the sequencer. When this low level instruction is retrieved from instruction queue 471 and executed by the sequencer, it will terminate further retrieval and execution of low level instructions by decoder 472. Additionally, a status bit(s) in task register 518–526 will be set by decoder 472. This status bit will be read by the high level engine 480 to determine that the low level engine 470 has stopped executing instructions. High level engine 480 will then issue an interrupt to SP 360, and execute a STOPST Type I instruction to stop high level engine execution. It should be noted that during and after the reading of the 100 sectors, high level engine 480 will be continually checking HLE task register 518–526 to determine if any new commands have issued or the status has changed. It should be noted that if any abnormal condition arises that causes low level engine 470 to stop executing instructions, the status will be reported to the high level engine and, ultimately, SP 360, through task registers 518–526.

The person of ordinary skill in the art will easily appreciate, from the example given, the cooperation of the aforementioned elements to implement other commands such as write commands. Moreover, it should be appreciated that the cooperation of the various elements described in the examples is a function of the programming of the high level engine. By programming the high level engine using the special instruction set, the disk formatter can be adapted to perform different operations in different ways, and the same operations in different ways. This capability to reprogram the disk formatter through the high level engine, using the special instruction set, inheres in the inventive concept therein, which extends to variations from the examples given. While this invention has been described with reference to an illustrative embodiment, this description is not to be considered in a limiting sense. Various modifications to the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A disk formatter in a headerless hard disk drive controller, said disk formatter comprising:
    a high level processing engine, wherein said high level processing engine is programmed for executing a series of high level instructions relating to a position of servo information in a headerless format;
    a low level processing engine, wherein said low level processing engine is programmed for executing a series of low level instructions relating to said position of said servo information in said headerless format;
    wherein said high level processing engine executes said series of high level instructions relating to said position of said servo information in said headerless format in order to generate said series of low level instructions relating to said position of said servo information in said headerless format; and
    wherein said low level processing engine executes said series of low level instructions relating to said position of said servo information in said headerless format in order to generate a series of control signals to position a head.

2. A disk formatter according to claim 1, wherein said high level processing engine is programmable with a specially defined set of high level instructions to accommodate different disk drive formats and wedge tracking schemes.

3. A disk formatter according to claim 2, wherein said set of high level instructions comprise assembly code instructions.

4. A disk formatter according to claim 1, wherein said series of control signals comprise one or more of a read gate control signal, write gate control signal, error correction coder/decoder control signal and buffer memory control signal.

5. A disk formatter according to claim 2, wherein said high level processing engine executes said series of high level instructions in order to implement a host command.

6. A disk formatter according to claim 5, wherein said series of low level instructions are stored in an instruction queue prior to execution by said low level processing engine.

7. A disk formatter according to claim 6, wherein said series of low level instructions cause said hard disk drive controller to read data from or write data to a first data sector.

8. A disk formatter according to claim 7, wherein said high level processing engine executes a second series of high level instructions for a second data sector while said low level processing engine is executing said series of low level instructions for said first data sector.

9. A disk formatter according to claim 1, wherein said high level processing engine is programmed in conformance with an index pulse based wedge tracking system.

10. A disk formatter according to claim 1, wherein said high level processing engine is programmed in conformance with a unique binary sequence based wedge tracking system.

11. A disk formatter according to claim 10, wherein said high level processing engine is programmed to operate with a geometry per wedge based disk format.

12. A disk formatter according to claim 1, further comprising a DMA memory.

13. A disk formatter according to claim 12, further comprising a processor interface for interfacing said high level processing engine with one or more other processors.

14. A disk formatter according to claim 13, further comprising a disk formatter/servo timing logic interface.

15. A disk formatter according to claim 14, wherein said disk formatter/servo timing logic generates a series of sector pulses.

16. A disk formatter according to claim 15, wherein said high level processing engine maintains a sector number count based on said series of sector pulses.

17. A disk formatter according to claim 16, wherein said high level processing engine maintains a wedge number count.

18. A disk formatter according to claim 17, wherein said high level processing engine maintains a target sector.

19. A disk formatter according to claim 18, wherein said high level processing engine causes said low level processing engine to begin said execution of said series of low level instructions when said sector number count compares equal to said target sector.

20. A disk formatter according to claim 18, wherein said high level processing engine causes said low level processing engine to begin said execution of said series of low level instructions before said sector number count compares equal to said target sector.

21. A method of signal processing in a disk formatter for a headerless hard disk drive controller, comprising:

executing a series of high level instructions relating to a position of servo information in a headerless format in a high level processing engine;

executing a series of low level instructions relating to said position of said servo information in said headerless format in a low level processing engine;

wherein said series of high level instructions relating to said position of said servo information in said headerless format are converted into said series of low level instructions relating to said position of said servo information in said headerless format; and wherein said series of low instructions relating to said position of said servo imformation in said headerless format are converted into a series of control signals generated by said disk formatter to position a head.

22. The method of claim 21, wherein said high level processing engine is programmable with a set of high level instructions to accommodate different disk drive formats and wedge tracking schemes, and further comprising the step of programming said high level processing engine in accordance with a specific headerless disk drive format.

23. The method of claim 22, wherein said particular headerless disk drive format includes an index pulse based wedge tracking scheme.

24. The method of claim 21, wherein said particular headerless disk drive format includes a unique binary sequence based wedge tracking scheme.

25. The method of claim 24, wherein said particular headerless disk drive format includes a geometry per wedge sector layout within a wedge scheme.

26. The method of claim 22, wherein said step of programming utilizes assembly code instructions.

27. The method of claim 21, wherein said series of control signals comprise one or more of a read gate control signal and a write gate control signal.

28. The method of claim 21, further comprising the step of storing said series of low level instructions in an instruction queue before said low level instructions are executed by said low level processing engine.

29. The method of claim 21, wherein said series of low level instructions cause said hard disk controller to read data from or write data to a first data sector.

30. The method of claim 29, further comprising the step of said high level processing engine executing a second series of high level instructions while said low level engine is executing said series of low level processing instructions.

* * * * *